(12) United States Patent
Rhodes et al.

(10) Patent No.: US 10,197,378 B2
(45) Date of Patent: Feb. 5, 2019

(54) TIME DOMAIN DEPTH SENSOR

(71) Applicant: Deere & Company, Moline, IL (US)

(72) Inventors: Michael L. Rhodes, Richfield, MN (US); Kartheek Karna, Fargo, ND (US); Nikolai Tevs, Daytona Beach Shores, FL (US); Jeffrey S. Puhalla, Hawley, MN (US); Noel W. Anderson, Fargo, ND (US)

(73) Assignee: DEERE & COMPANY, Moline, IL (US)

( * ) Notice: Subject to any disclaimer, the term of this patent is extended or adjusted under 35 U.S.C. 154(b) by 70 days.

(21) Appl. No.: 15/336,127

(22) Filed: Oct. 27, 2016

(65) Prior Publication Data
US 2018/0120082 A1 May 3, 2018

(51) Int. Cl.
*G01B 7/26* (2006.01)
*A01B 63/111* (2006.01)
*A01C 7/20* (2006.01)
*A01B 79/00* (2006.01)

(52) U.S. Cl.
CPC ............ *G01B 7/26* (2013.01); *A01B 63/1112* (2013.01); *A01C 7/203* (2013.01); *A01B 79/005* (2013.01)

(58) Field of Classification Search
CPC ........................................................ G01B 7/26
USPC ........................................ 324/329, 326, 323
See application file for complete search history.

(56) References Cited

U.S. PATENT DOCUMENTS

| 3,635,271 | A | * | 1/1972 | Markham | ............ | A01F 29/095 |
| | | | | | | 241/101.762 |
| 5,329,754 | A | * | 7/1994 | Fuesz | ................ | A01D 34/8355 |
| | | | | | | 56/504 |
| 5,524,560 | A | | 6/1996 | Carter | | |
| 6,978,532 | B1 | * | 12/2005 | Merritt | ................... | B23P 15/40 |
| | | | | | | 29/417 |
| 8,994,527 | B2 | * | 3/2015 | Verhulst | ............... | E21B 49/025 |
| | | | | | | 116/264 |
| 2003/0016029 | A1 | | 1/2003 | Schuler et al. | | |

(Continued)

FOREIGN PATENT DOCUMENTS

DE 10003782 A1 12/2001

OTHER PUBLICATIONS

English abstract for DE10003782 A1.
(Continued)

*Primary Examiner* — Giovanni Astacio-Oquendo

(57) ABSTRACT

Embodiments herein relate to a time domain depth sensor system and method for determining a depth of a ground engaging device in soil. The sensor system may include a signal transmission element arranged on an outer periphery of a ground engaging device that is adapted to penetrate soil. The signal transmission element can be arranged to receive and transmit an electrical signal that is responsive to impedance discontinuities detected by a pulse detector. The pulse detector is configured to detect a first and a second reflected signal corresponding to a sensed impedance discontinuities at a first and a second soil location. An electronic data processor is communicatively coupled the pulse detector and is configured to determine the depth of the ground engaging device in the soil based on a difference between a first time of propagation of the first reflected signal and a second time of propagation of the second reflected signal.

15 Claims, 7 Drawing Sheets

(56) References Cited

U.S. PATENT DOCUMENTS

| | | |
|---|---|---|
| 2007/0204686 A1 | 9/2007 | Solis |
| 2009/0112475 A1 | 4/2009 | Christy et al. |
| 2015/0334914 A1* | 11/2015 | Zielke .................. A01C 21/00 701/50 |
| 2016/0061762 A1* | 3/2016 | Buss .................. G01N 27/223 324/323 |
| 2016/0174456 A1 | 6/2016 | Barychev et al. |

OTHER PUBLICATIONS

Adamchuk, Viacheslav I.; Hummel, J. W.; Morgan, M. T.; and Upadhyaya, S. K., "On-the-go soil sensors for precision agriculture" (2004). Biological Systems Engineering: Papers and Publications. Paper 1. http://digitalcommons.unl.edu/biosysengfacpub/1.

Sudduth, K.A.; Hummell, J.W.; and Birrell, S.J., "Sensors for Site-Specific Management" (1997). http://www.ars.usda.gov/sp2UserFiles/Place/50701000/cswq-0267-sudduth.pdf.

European Search Report issued in counterpart application No. 17193563.8 dated Mar. 5, 2018. (7 pages).

* cited by examiner

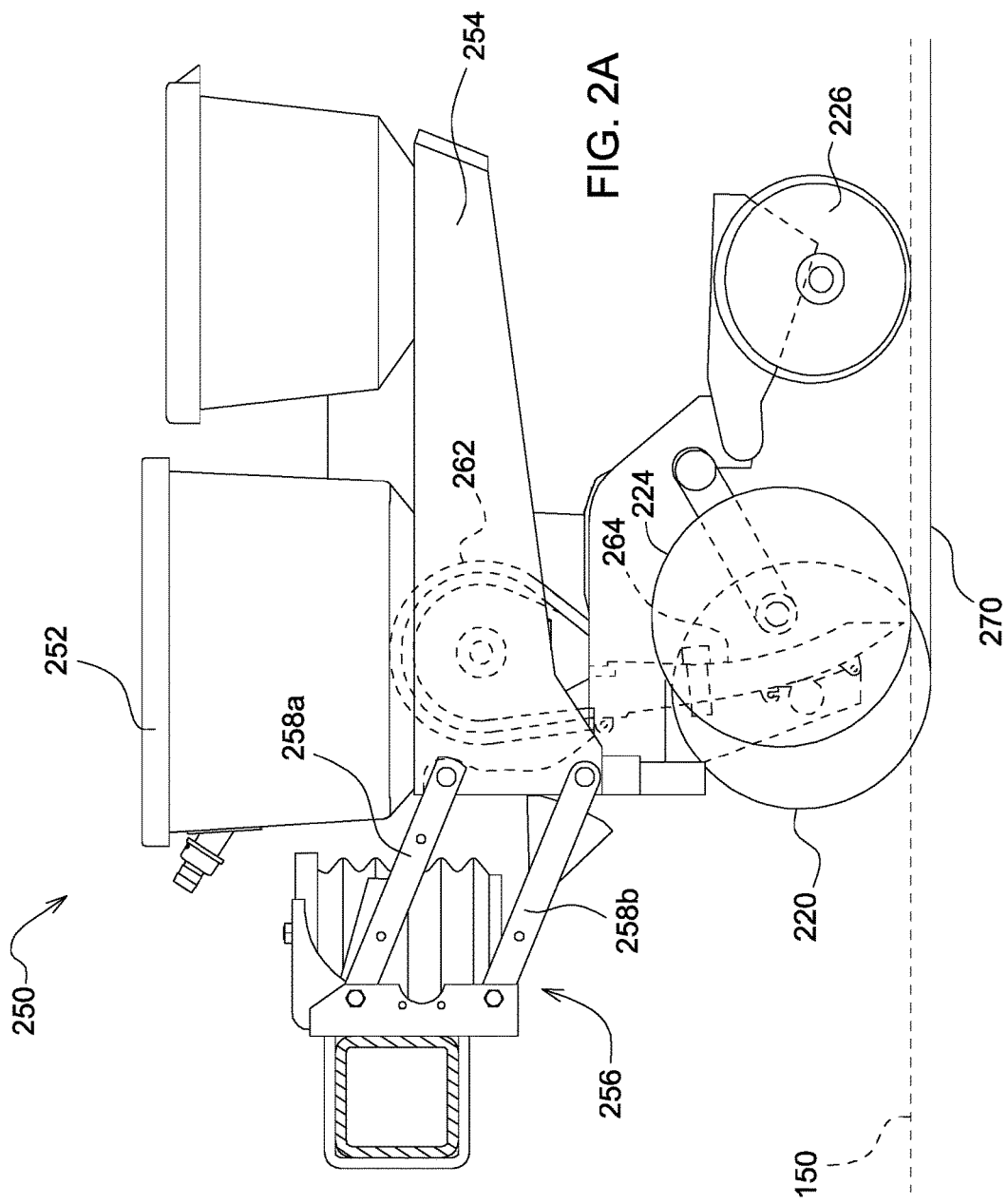

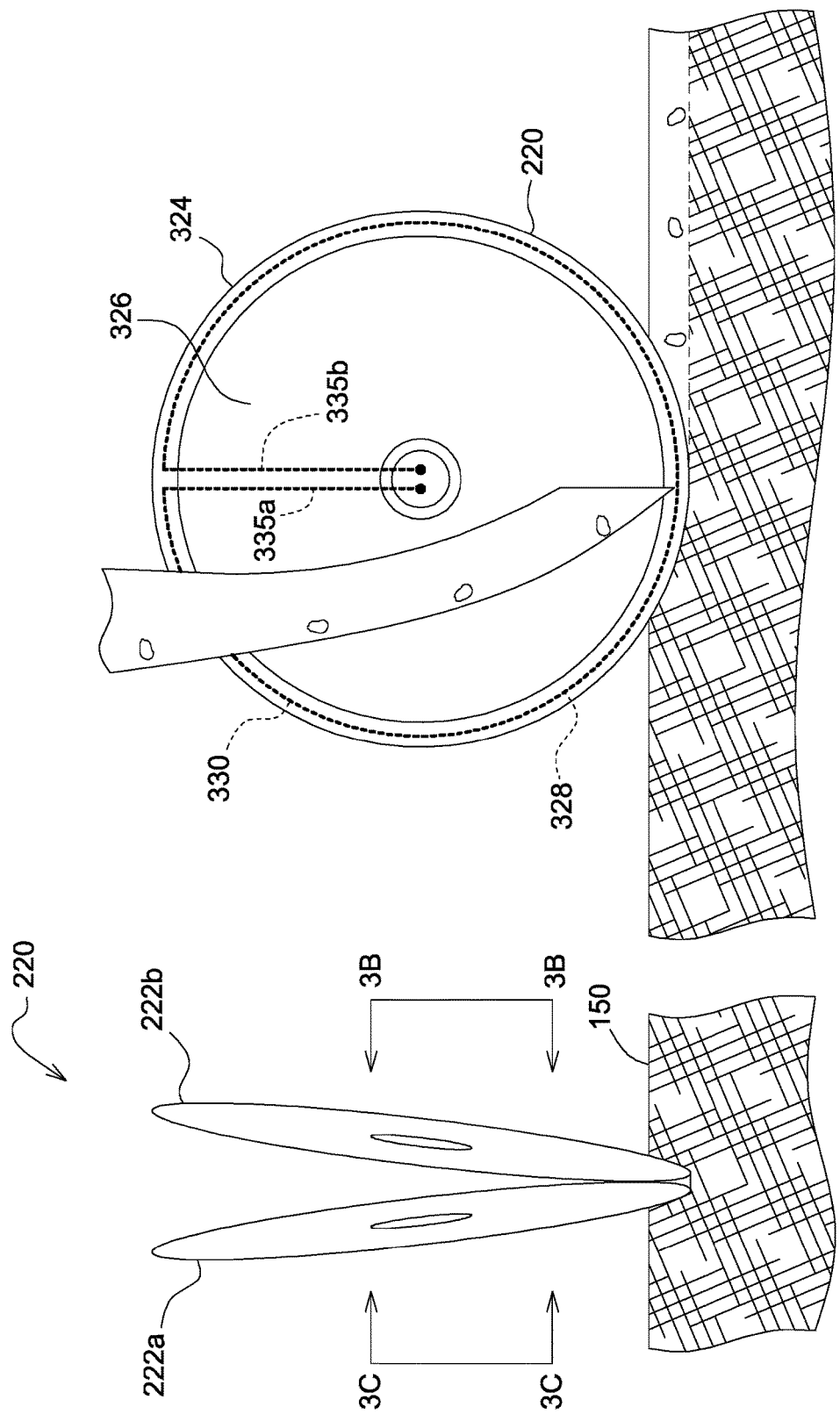

TIME DOMAIN DEPTH SENSOR

TECHNICAL FIELD

The present disclosure generally relates to a time domain depth sensor system for determining a depth of a ground engaging device in soil.

BACKGROUND

In the farming industry, maintaining optimal soil conditions to maximize crop yields is highly important. By maintaining optimal soil conditions, crops are able to receive adequate nutrients that are essential for healthy growth, which in turn leads to sustained crop production. Examples of good soil quality can include, for example, good soil tilth, adequate planting depths, limited plant pathogens, and good soil drainage, wherein the absence of any of such conditions can lead to failed germination. For example, at shallower trench depths, greater moisture and temperature fluctuations can be experienced, thereby causing crop damage. Therefore, there is a growing need in the farming industry for agricultural apparatuses and systems that are capable of monitoring soil conditions and performing accurate depth measurements.

To address such concerns, some conventional approaches utilize down pressure measurements and mechanical design to infer planting depth. For example, certain mechanical apparatus, such as feeler gages, potentiometers, linear position sensors and ultrasonic range finders, are susceptible to inaccurate depth measurements, which tend to decrease yields of crops planted with inaccurate seed depths. Therefore, there still exists a need in the art for a system that is capable of performing precise real-time depth measurements.

SUMMARY

A sensor system for determining the depth of a ground engaging device of a planter in soil utilizing time domain reflectometry is disclosed herein. The sensor system may include a ground engaging device that is adapted to penetrate soil. At least one signal transmission element can be arranged to extend proximate an outer periphery of the ground engaging device to receive and transmit electrical signals. For example, a signal generator is coupled to the signal transmission element and transmits an electrical signal into the signal transmission element that is detected by a pulse detector. The pulse detector is coupled between the signal transmission element and the signal generator and is configured to detect a first reflected signal at a first soil location and a second reflected signal at a second soil location, wherein the first reflected signal and the second reflected signal are respectively generated in response to a detected impedance discontinuity in the signal transmission element. An electronic data processor is communicatively coupled to the signal generator and the pulse detector and is configured to determine the depth of the ground engaging device in the soil based on a difference between a first time of propagation of the first reflected signal and a second time of propagation of the second reflected signal.

BRIEF DESCRIPTION OF THE DRAWINGS

FIG. 2A is a side view of one embodiment of a planter system in which the sensor system of FIG. 1 is incorporated.

FIG. 2B is a rear view of a ground engaging device according to an embodiment of the present invention.

FIG. 3A is a side view of a signal transmission element of the sensor system FIG. 1 arranged on a ground engaging device according to an embodiment.

Like reference numerals are used to indicate like elements throughout the several figures.

DETAILED DESCRIPTION

Figure 1:
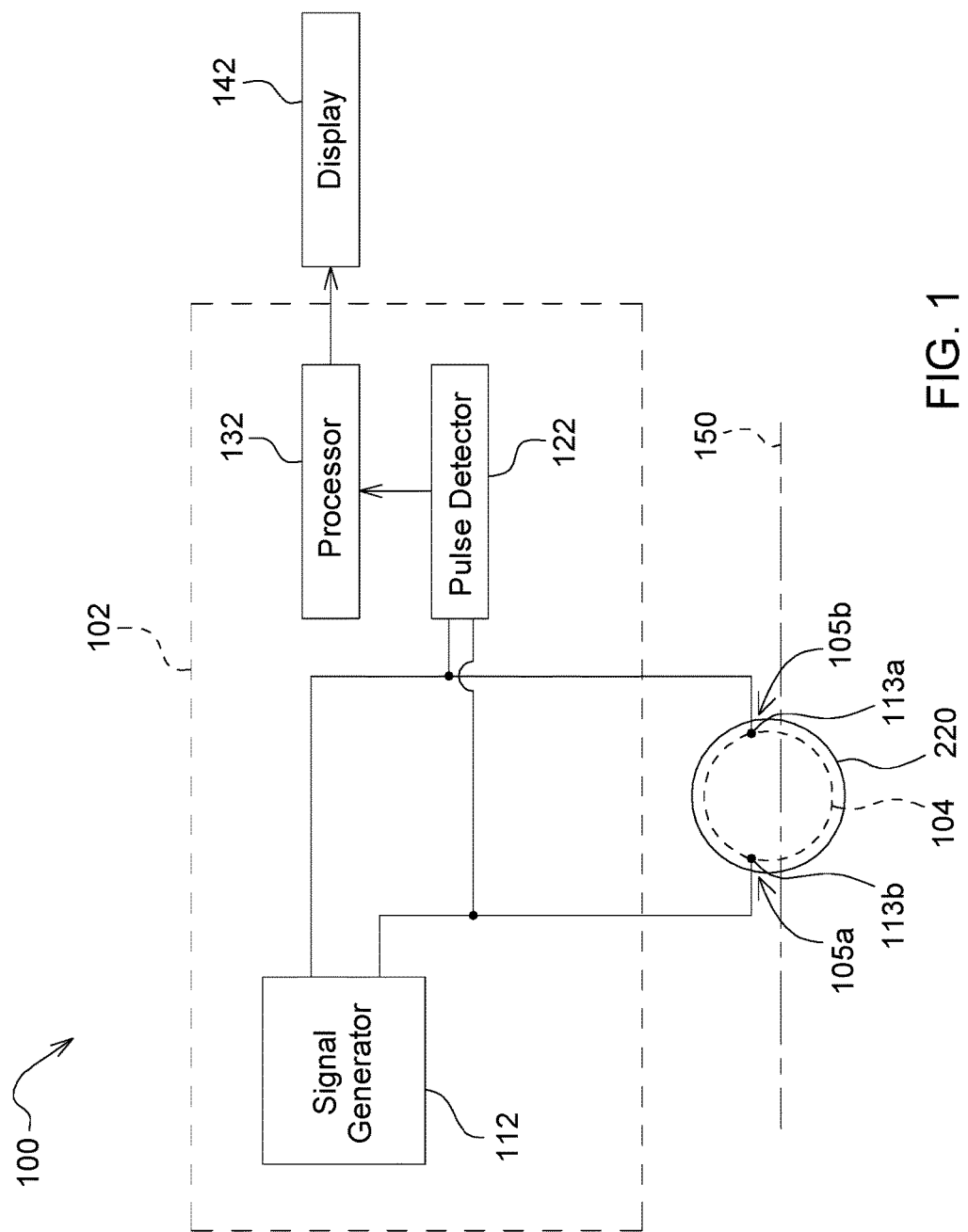
FIG. 1 is a block diagram of one embodiment of a sensor system according to an embodiment of the present invention.

Referring to FIGS. 1-2B, a sensor system 100 is shown in combination with a planter system 250, which, as illustrated, may include a planter row unit configured to travel across a field while distributing seeds or other crop materials (e.g., roots, bulbs, or rhizomes) into the soil. In other embodiments, sensor system 100 may also be employed in air seeders, grain drills, tillage units, or other similar agricultural devices with FIG. 1 being but one exemplary embodiment.

In FIG. 1, a block diagram of one embodiment of the sensor system 100 is shown. In some embodiments, the sensor system 100 can comprise a time domain sensing unit 102 electrically coupled to a signal transmission element 104 arranged on a ground engaging device 220. For example, the time domain sensing unit 102 can comprise a signal generator 112, a pulse detector 122, a processor 132 and a display 142. As depicted, signal generator 112 can be electrically coupled to a first end 105a of the signal transmission element 104 via a first contact 113a, such that a series of electrical pulses (e.g., step or pulse functions) are generated by the signal generator 112 and transmitted through the signal transmission element 104. Each pulse quickly propagates through signal transmission element 104, for example, on the scale of nanoseconds. As each pulse propagates through the signal transmission element 104 to a second end 105b, a portion of the electrical pulse is reflected back when impedance variations or discontinuities are encountered, which is detected by pulse detector 122 via a second contact 113b.

Particularly, as the ground engaging device 220 enters and exits the soil 150 there will be a measurable change in the impedance (i.e., an impedance mismatch) at the air-soil interface as a result of a change in the dielectric medium (i.e., air to soil) and constants. For example, air has a relatively small dielectric constant of approximately 1, and although dry soil has an equally small dielectric constant (approximately 2.5), the moisture content (i.e., water content) of the soil must be taken into account. As such, because the dielectric constant of water is quite large (approximately 80) in comparison to air and dry soil, there will be a significant change in the impedance at the air-soil interface. In turn, the overall travel time of the reflected electrical pulse will be directly related to the change in dielectric constant at the air-soil interface or associated with the dielectric constant change with respect to the depth of the ground engaging device 220 or associated crop material in the soil.

The processor 132 is operatively coupled to the pulse detector 122 and is configured to receive and process outputs signals generated by pulse detector 122 to determine a depth of an opening 270 formed by the ground engaging device 220. In embodiments, processor 132 may include a digital signal processor (DSP), microprocessor, microcontroller, electrical control unit, or other suitable processor units, as well as any one of hardware, firmware, and/or software. In embodiments, processor 132 may be communicatively coupled to the display 142 via wired or wireless communications (e.g., via WiFi, Bluetooth, or Ethernet). The information determined by the processor 132 may be displayed on the display 142 or stored in a memory unit of processor 132 such that the information may be accessed in real-time or at a later time by a vehicle operator of the planter system 250 or some other user. In various embodiments, display 142 may include a LCD display, a LED display, an OLED display, touch display, or other suitable user interface.

In FIG. 2A, an illustration of planter system 250 in which sensor system 100 is incorporated is shown according to an embodiment. In embodiments, the planter system 250 can comprise a hopper 252 arranged in a generally upright position that is mounted to a frame 254. A parallel arm arrangement 256 comprising upper and lower arms 258a, 258b and an actuation device 260 can be mounted to support frame 254 in a cantilever-like configuration, such that it extends outwardly and away from frame 254. In some embodiments, actuation device 260 may be mounted to at least one of upper or lower arm 258a, 258b and can include mechanical, pneumatic, hydraulic, or other suitable actuators to apply lift and/or downforce on the planter system 250. A metering unit 262 having a generally circular configuration can be arranged beneath hopper 252 and can be configured to distribute seeds received from hopper 252 into a seed tube 264. The seed tube 264 directs the seeds received from the metering unit 262 to an opening 270 formed in the soil 150 by a ground engaging device 220. In some embodiments, a support member 266, which can be arranged to extend downwardly from frame 254, is mounted adjacent seed tube 264. The support member 266 can be operably coupled to a ground engaging device 220 and can comprise a shank, vertical post, or other suitable support structure.

As depicted in FIG. 2B, in some embodiments, ground engaging device 220 can comprise a first and a second opener disc 222a, 222b that are rotatable about a center axle and arranged to form the opening 270. In some embodiments, fewer or more opener discs 222a, 222b may be incorporated according to design and/or specification requirements, while, in other embodiments, the ground engaging device 220 may include a tillage blade, grain drill, or other suitable devices. As planter system 250 travels across a field, the opener discs 222a, 222b will converge to form the opening 270 at approximately the point where the opener discs 222a, 222b enter the soil (refer, e.g., to FIG. 2B). Seeds are then deposited at the bottom of the opening 270 and excess soil is removed from channel 270 to provide better visibility and to ensure proper seed-to-soil contact. To regulate the penetration depth of ground engaging device 220, at least two gauge wheels 224 are mounted proximate ground engaging device 220. A closing wheel assembly 226 can be arranged following the ground engaging device 220 and gauge wheels 224 and is operable to close the opening 270 formed by ground engaging device 220.

Figure 3C:
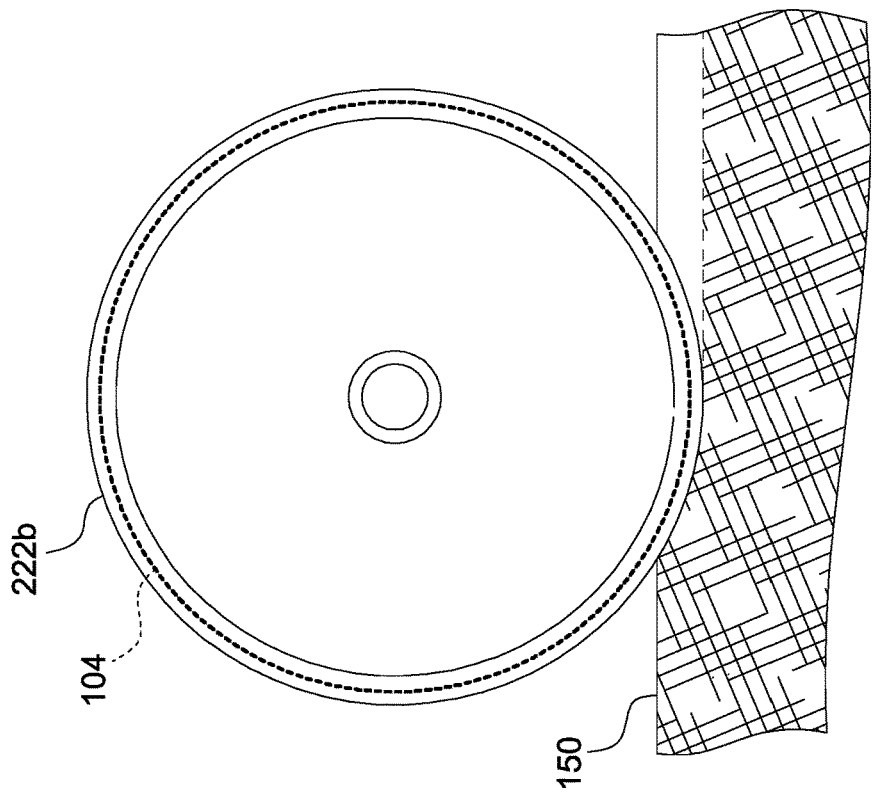
FIG. 3C is a side view of a signal transmission element of the sensor system FIG. 1 arranged on a rear disc of the ground engaging device of FIG. 2B according to an embodiment.
Figure 3B:
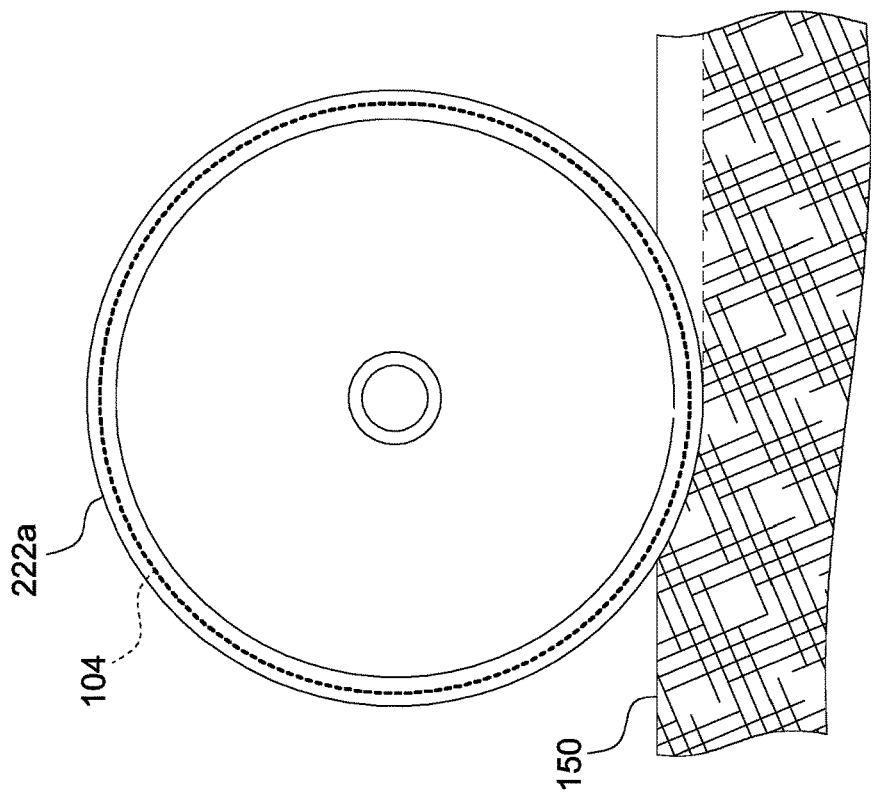
FIG. 3B is a side view of a signal transmission element of the sensor system FIG. 1 arranged on a forward disc of the ground engaging device of FIG. 2B according to an embodiment.

Referring now to FIG. 3, the signal transmission element 104 as discussed with reference to FIG. 1 can be arranged proximate an outer periphery 324 of at least one of opener discs 222a or 222b. Particularly, the signal transmission element 104 can be arranged to extend annularly around a front surface 326 of the opener disc from the first end 105a to the second end 105b. In embodiments, the signal transmission element 104 may include a cable 330 having a conductive element disposed within an electrical insulating shell for transmitting signals. Cable 330 may be of any predetermined length and will vary according to the design and specification requirements. For example, because cable length affects signal quality, cable 330 should be sized not only relative to the dimensions of the opener disc, but should also be sized to ensure good signal quality. Additionally, although the signal transmission element 104 is shown as including cable 330 in embodiments discussed herein, it should be noted that, in other embodiments, the signal transmission element 104 can include twisted pair cables, open wire cables, conductive rods, or other suitable signal carrying elements. In still other embodiments, two or more signal transmission elements 104 can be arranged on either or both of opener discs 222a, 222b to compensate for wear of the opener discs 222a, 222b (refer, e.g., to FIGS. 2B and 3B-3C). As depicted in FIG. 3, in some embodiments, the opener discs 222a or 222b can further comprise a wire receiving channel 328 formed in a front surface 326 of the opener disc that is arranged to receive and secure positioning of the signal transmission element 104. In other embodiments, the signal transmission element 104 may be surface mounted to the opener disc and enclosed by an enclosure (not shown) formed of a non-conductive material such as a ceramic or plastic plate.

With respect to FIGS. 1-3, it will be appreciated by those skilled in the art that FIGS. 1-3 are not drawn to scale and are for illustrative purposes only. Notably, the size, dimensions, structural layout, and quantity of the various components can and will vary in other embodiments. For example, in other embodiments, sensor system 100 may include additional circuitry such as signal processing circuitry, or additional components such as two or more time domain sensing units, detectors, or processors.

Figure 4:
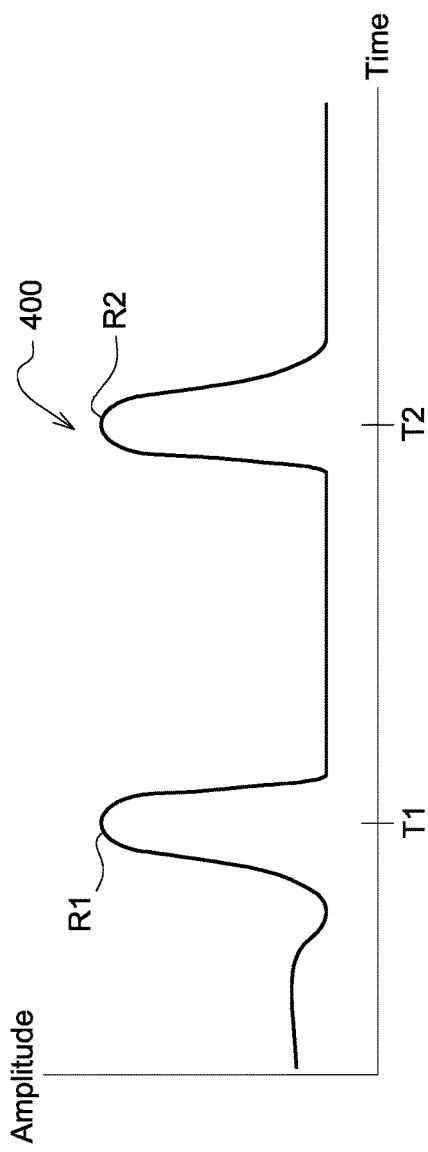
FIG. 4 is an illustration of a pulse waveform of a transmission pulse transmitted by the sensor system of FIG. 1.
Figure 5:
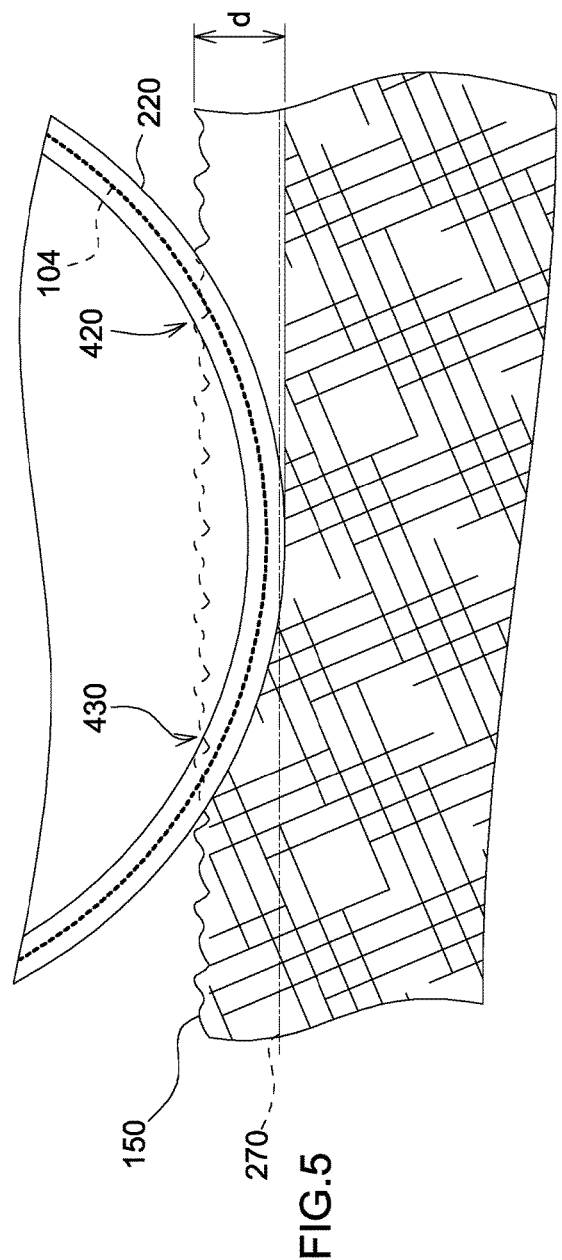
FIG. 5 is an illustration of the sensor system of FIG. 1 in use.

Referring now to FIGS. 4-7, a graphical illustration of a pulse waveform and a pictorial illustration of the corresponding soil reflection locations are shown. In FIG. 4, a pulse waveform 400 of the response measured by the pulse detector 122 when the ground engaging device 220 carrying the signal transmission element 104 enters and exits the soil 150 is depicted. The first reflection pulse R1 occurring at a time T1 represents the pulse reflection as the ground engaging device 220 enters the soil at the first soil location 420 (FIG. 5). Similarly, the second reflection pulse R2 occurring at a time T2, represents the pulse reflection as the ground engaging device 220 exits the soil at the second soil location 430. As depicted, the amplitude (i.e., intensity) of each of the first and second reflection pulses R1, R2 are displayed on the vertical axis, while the corresponding reflection times T1, T2 are displayed along the horizontal axis. The amplitude and shape of each reflected pulse will be based on the magnitude of the impedance change. For example, as discussed with reference to FIG. 1, as the ground engaging device 220 enters the soil, there will be a relatively large impedance discontinuity encountered at the air-soil interface resulting from the changing dielectric values of air and soil.

Figure 6:
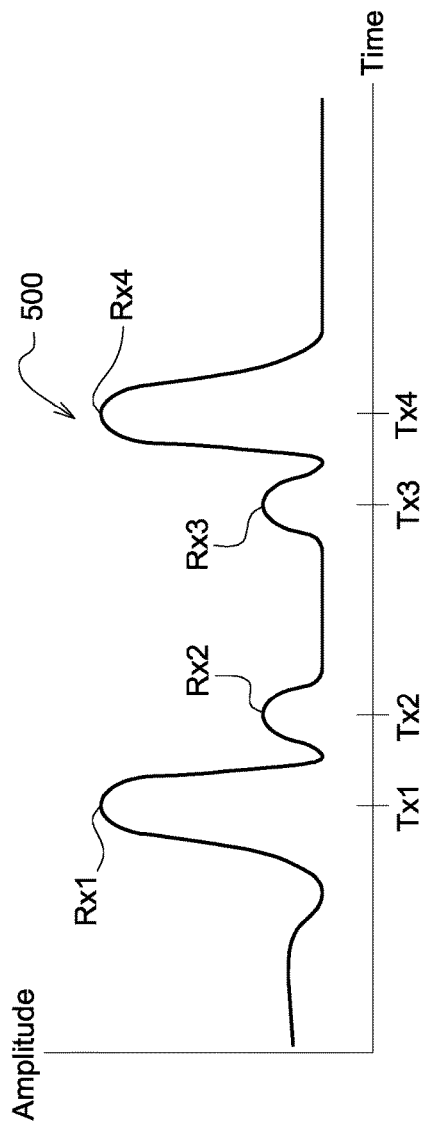
FIG. 6 is an illustration of a pulse waveform of a transmission pulse transmitted by the sensor system of FIG. 1.
Figure 7:
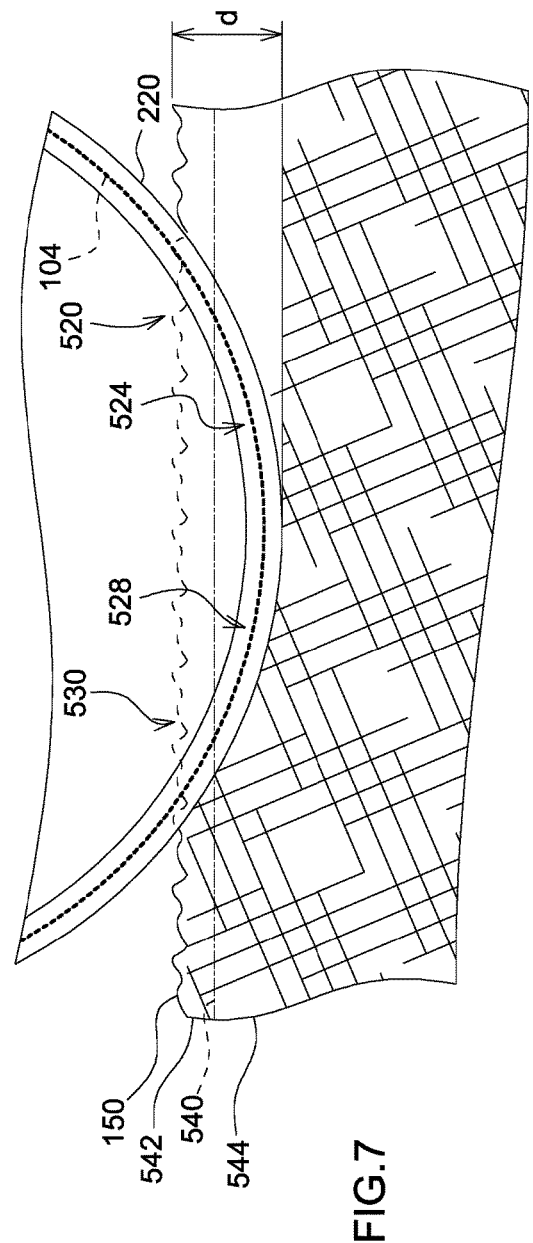
FIG. 7 is an illustration of the sensor system of FIG. 1 in use.

In FIG. 6, another exemplary pulse waveform 500 is shown that may be encountered under varying soil conditions. For example, in some embodiments, a water line 540 may be disposed beneath the soil's surface at a fixed location to supply water to the soil and materials (e.g., seeds, grains, etc.) deposited in the opening 270. In such an embodiment, the soil beneath the ground surface will be generally divided into two zones: a dry soil zone 542 located above the water line 540 and a moist soil zone 544 located below the water line 540. Notably, the two zones are characterized based on their relative moisture contents, with the moist soil zone 544 having a greater moisture content and dielectric value than that of the dry soil zone 542 under most conditions. As illustrated in FIG. 6, at least two impedance discontinuities are encountered in each of the dry and moist soil zones 542, 544 as the ground engaging device 220 enters and exits the soil. For example, similar to pulse waveform 400, reflection pulses $R_x1$, $R_x4$ occurring at times $T_x1$, $T_x4$ are reflected at the air-dry soil interface as the ground engaging device 220 enters and exits the soil at locations 520, 530. Additionally, as the ground engaging device rotates throughout the soil between each of zones 542, 544, reflection pulses $R_x2$, $R_x3$ occurring at times $T_x2$, $T_x3$ are reflected at the dry soil-moist soil interfaces at soil locations 524, 528.

The pulse waveforms 400, 500 can be displayed on a user interface such as display 142, which can be located in an operator vehicle or at a remote location, for view by an operator. Further, it should be noted that pulse waveforms 400, 500 are representative of ideal traces of the propagation signals, and may additionally include reflections generated by other electrical discontinuities, such as, e.g., undesirable background noise, detected along the length of signal transmission element 104. Such noise, however, may be filtered by a filtering circuit (not shown) included in sensor system 100.

Figure 8:
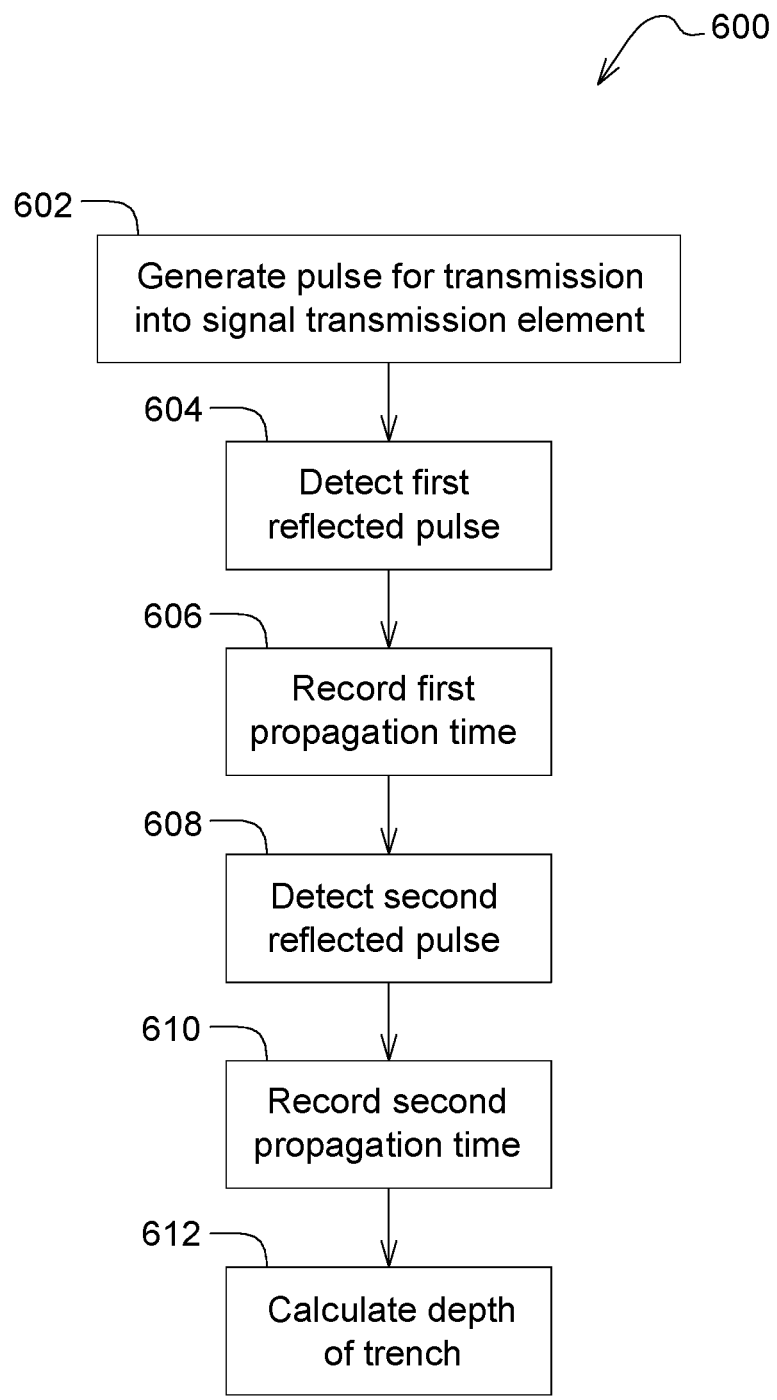
FIG. 8 is a flow diagram of a method for determining a depth of a trench utilizing the sensor system of FIG. 1 according to an embodiment.

Referring to FIG. 8, a flow diagram of a method 600 for determining the depth of a material receiving channel is shown. At 602, the signal generator 112 generates a series of pulses signals having a known propagation velocity that are transmitted through the signal transmission element 104. As the ground engaging device 220 penetrates the soil at a first location 420, 520, the first reflected pulse R1 or $R_x1$, as discussed with reference to FIGS. 4 and 6, is reflected back through the signal transmission element 104 at 604 in response to a sensed impedance discontinuity. A propagation time T1 or $T_x1$ of the first reflected pulse R1 or $R_x1$ is recorded by the pulse detector 122 at 606. Similarly, as the ground engaging device 220 exits the soil 150 at a second location 430, 530 (i.e., air-soil interface), the second reflected pulse R2 or $R_x2$ is reflected back through the signal transmission element 104 at 608 in response to the change in the dielectric constants of the sensed mediums. At 610, a propagation time T2 or $T_x2$ of the second reflected pulse R2 or $R_x2$ is recorded by the pulse detector 122. In some embodiments, the time domain sensing unit 102 can further comprise a timing means to monitor the time at which the initial pulse is transmitted into the signal transmission element and the time at which the pulse returns to the initial transmission point.

Next at 612, the distance between the initial transmission point and any of the reflected reference points is determined. In one embodiment, the processor 132 of the time domain sensing unit 102 may utilize the propagation speed of the pulse waveform collectively with each of the recorded times (e.g., start time, propagation times, and/or total travel time) to determine a distance to a measured reflection. For example, the distance to the first location 420 in which R1 is reflected may be determined based on the start time in which the initial pulse is transmitted, the propagation time T1 of the reflected pulse, and the propagation velocity of the pulse wave. In other words, the distance to a discontinuity (i.e., pulse reflection) may be calculated based on an elapsed time between a transmitted pulse and a reflected pulse, which in turn allows the depth of penetration of the ground engaging device 220 in the opening 270 to be determined. For example, a time difference between T1 and T2 (i.e., total propagation time) is computed by the processor 132 to determine the depth of penetration of the ground engaging device 220 in the soil, which corresponds to a direct measurement of the depth of the opening 270.

In other embodiments, the computed time difference may be used to determine a moisture content of the soil. For example, the total propagation time may be compared against reference values of propagation times for materials of known permittivity to determine the moisture content. In still other embodiments, the depth at which the seeds or other crop material is deposited may be approximated based on the depth of the ground engaging device 220. Once the depth is determined, processor 132 outputs the results to a user interface such as display 142, which can be located locally on a vehicle coupled to the planter system 250 or at a remote location, to thereby allow a user or operator to readily ascertain depth measurements of the opening 270 in real time.

Without in any way limiting the scope, interpretation, or application of the claims appearing below, a technical effect of one or more of the example embodiments disclosed herein is a time domain sensor system and method for determining a depth of a trench. While the present disclosure has been illustrated and described in detail in the drawings and foregoing description, such illustration and description is not restrictive in character, it being understood that illustrative embodiment(s) have been shown and described and that all changes and modifications that come within the spirit of the present disclosure are desired to be protected. Alternative embodiments of the present disclosure may not include all of the features described yet still benefit from at least some of the advantages of such features. Those of ordinary skill in the art may devise their own implementations that incorporate one or more of the features of the present disclosure and fall within the spirit and scope of the appended claims.

What is claimed is:

1. A sensor system for determining the depth of a ground engaging device in soil utilizing time domain reflectometry, the sensor system comprising:
   a ground engaging device adapted to penetrate soil;
   at least one signal transmission element arranged to extend proximate an outer periphery of the ground engaging device;
   a signal generator coupled to the signal transmission element and configured to transmit an electrical signal into the signal transmission element;
   a pulse detector coupled between the signal transmission element and the signal generator and configured to detect a first reflected signal at a first soil location and a second reflected signal at a second soil location, wherein the first reflected signal and the second reflected signal are respectively generated in response to a detected impedance discontinuity in the signal transmission element; and an electronic data processor communicatively coupled to the signal generator and pulse detector, wherein the electronic data processor is configured to determine the depth of the ground engaging device based on a difference between a first time of propagation of the first reflected signal and a second time of propagation of the second reflected signal.

2. The sensor system of claim 1, wherein the at least one signal transmission element is arranged to extend between a first end and a second end to approximately encompass a diameter of the ground engaging device.

3. The sensor system of claim 1, wherein the at least one signal transmission element comprises two or more metallic conductors.

4. The sensor system of claim 1, wherein the at least one signal transmission element comprises a cable having a fixed length.

5. The sensor system of claim 4, wherein the cable comprises at least one of a twisted pair cable, an open wire cable, a conductive rod, or combinations thereof.

6. The sensor system of claim 1, wherein the ground engaging device is coupled to a frame of an agricultural implement, and wherein the ground engaging device comprises at least one opener disc.

7. The sensor system of claim 6, wherein the at least one opener disc comprises an electrically insulating material.

8. The sensor system of claim 1, wherein the ground engaging device comprises at least one of a tillage blade, a grain drill, or combinations thereof.

9. The sensor system of claim 1 further comprising a display arranged to display a depth profile of the soil.

10. The sensor system of claim 1, wherein the electrical signal is a step pulse voltage.

11. A method for determining a depth of a ground engaging device in soil, the method comprising:
providing a signal transmission element arranged on a ground engaging device;
generating a first pulse signal to be transmitted down the signal transmission element;
detecting at least one first reflected pulse at a first soil location;
detecting at least one second reflected pulse at a second soil location;
determining the depth of the ground engaging device in the soil by calculating a difference between a first time of propagation of the first reflected signal and a second time of propagation of the second reflected signal, wherein the difference corresponds to a calculated depth measurement; and
generating a depth profile of the ground engaging device in real time based on the calculated depth measurement for display on a user display.

12. The method of claim 11, wherein generating the first pulse signal comprises generating a series of electrical step pulses into the signal transmission element.

13. The method of claim 11, wherein detecting the first reflected pulse and the second reflected pulse further comprises correlating a measured amplitude of the respective first and second reflected pulses to an impedance.

14. The method of claim 11 further comprising determining a soil moisture boundary based on the calculated difference between the first time of propagation of the first reflected signal and the second time of propagation of the second reflected signal.

15. The method of claim 11 further comprising approximating a depth at which a crop material is deposited based on the calculated depth measurement.

* * * * *